United States Patent
Dimitrov

(10) Patent No.: US 8,997,093 B2
(45) Date of Patent: Mar. 31, 2015

(54) APPLICATION INSTALLATION MANAGEMENT BY SELECTIVELY REUSE OR TERMINATE VIRTUAL MACHINES BASED ON A PROCESS STATUS

(75) Inventor: Vencislav Dimitrov, Pernik (DE)

(73) Assignee: SAP SE, Walldorf (DE)

(*) Notice: Subject to any disclaimer, the term of this patent is extended or adjusted under 35 U.S.C. 154(b) by 324 days.

(21) Appl. No.: 13/449,088

(22) Filed: Apr. 17, 2012

(65) Prior Publication Data

US 2013/0275969 A1 Oct. 17, 2013

(51) Int. Cl.
*G06F 9/46* (2006.01)
*G06F 9/445* (2006.01)
*G06F 9/455* (2006.01)

(52) U.S. Cl.
CPC .............. *G06F 8/61* (2013.01); *G06F 9/45558* (2013.01); *G06F 2009/45575* (2013.01)
USPC .............................................. 718/1; 718/104

(58) Field of Classification Search
None
See application file for complete search history.

(56) References Cited

U.S. PATENT DOCUMENTS

| | | | |
|---|---|---|---|
| 8,176,486 B2* | 5/2012 | Amir Husain | 718/1 |
| 8,185,893 B2* | 5/2012 | Hyser et al. | 718/1 |

* cited by examiner

*Primary Examiner* — Mengyao Zhe
*Assistant Examiner* — Bing Zhao
(74) *Attorney, Agent, or Firm* — Schwegman Lundberg & Woessner, P.A.

(57) ABSTRACT

Example systems and methods of managing installation of applications are described. In one implementation, a repository stores data associated with multiple application instances. An orchestrator analyzes application instances running on multiple provisioned virtual machines and identifies at least one unused virtual machine among the multiple provisioned virtual machines. The orchestrator terminates processes running on the unused virtual machine and clears data associated with the unused virtual machine. The cleared virtual machine is added to a virtual machine pool for use by another application instance.

17 Claims, 9 Drawing Sheets

APPLICATION INSTALLATION MANAGEMENT BY SELECTIVELY REUSE OR TERMINATE VIRTUAL MACHINES BASED ON A PROCESS STATUS

FIELD

The present disclosure relates generally to the management of applications and, more specifically, to installing and configuring multiple applications.

BACKGROUND

Many computing systems allow users to manage applications running thereon. In some situations, users of these computing systems require significant knowledge and time to effectively manage the applications. Further, since different users may implement and manage applications utilizing different techniques, changes to the computing system may require different users to perform different activities based on a particular application's configuration and operation.

In some computing systems, applications are run on one or more virtual machines. A virtual machine includes, for example, a software implementation of a computing system (or operating system) that supports applications in a manner similar to a physical computing device. A particular computing system can implement multiple virtual machines, each of which are capable of running one or more applications. Users desiring to run applications on a virtual machine typically require specific expertise to properly deploy applications and manage their operation on the virtual machine.

BRIEF DESCRIPTION OF THE DRAWINGS

The present disclosure is illustrated by way of example and not limitation in the figures of the accompanying drawings, in which like references indicate similar elements.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide a platform and various techniques for managing the installation of one or more applications. These embodiments discuss, by way of example, the installation and management of applications running on one or more virtual machines. Some embodiments describe an example platform that allows users to deploy multiple applications in a managed environment. For example, this platform allows the users to configure applications, start applications, suspend applications, and stop applications. Additionally, the platform may support the monitoring the status or "health" of an application running on one or more systems or virtual machines. Embodiments of the platform are capable of scaling in capacity and performance to support changes in the number of running applications and the resource requirements of those applications.

The systems and methods described herein may also support the management and re-use of virtual machines in a secure manner. For example, when a virtual machine is no longer used by an instance of an application, the virtual machine may be cleared of all old data and reconfigured for use by a different application instance. Rather than terminating the existing virtual machine and provisioning a new virtual machine, which uses significant computational resources, the existing virtual machine is re-used without termination.

Some embodiments described herein simplify the preparation and management of system resources from the end user's perspective. The end user includes, for example, a person desiring to run an application on a virtual machine who does not have the knowledge to properly deploy applications and manage their operation on the virtual machine. These tasks, often performed by developers or administrators with specialized knowledge, are managed and performed on behalf of the end user by the methods and systems described herein. For example, some embodiments perform a significant portion of the tasks associated with preparing physical and virtual resources for running applications. Additionally, these embodiments perform many of the management tasks and operating system-specific tasks associated with running applications on one or more virtual machines, such that the end user is not responsible for those tasks.

Figure 1:
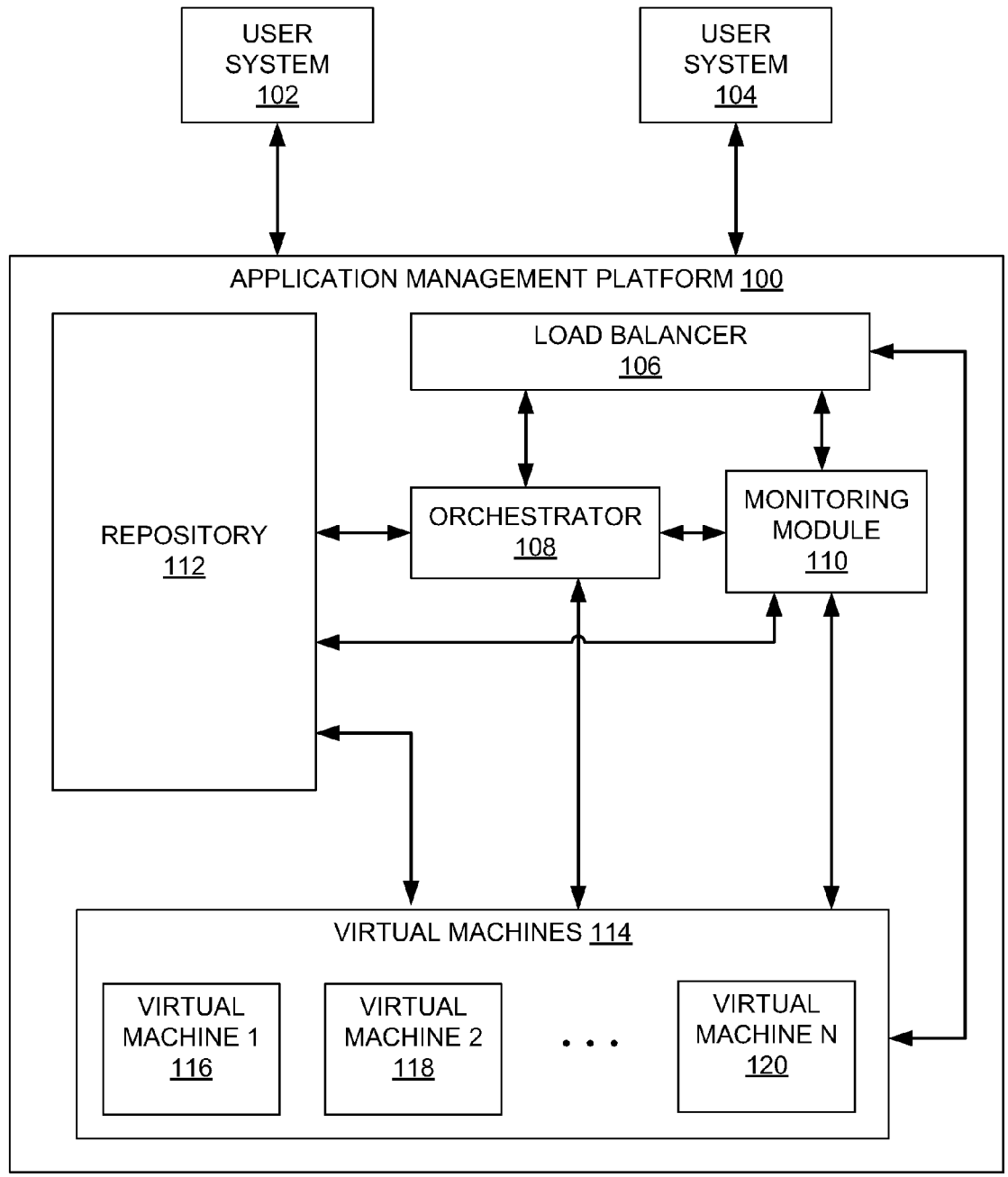
FIG. 1 is a block diagram of an example system capable of employing the systems and methods described herein.

FIG. 1 is a block diagram of an example system capable of employing the systems and methods described herein. In the example of FIG. 1, an application management platform 100 is accessed by any number of user systems 102, 104. The application management platform 100 includes, for example, machines and software to implement the described application management methods and systems. The user systems 102, 104 include any type of system capable of communicating with application management platform 100, such as a client machine, a client/server machine, a small device client machine, and the like. In particular embodiments, the user systems 102, 104 are implemented using any type of machine, such as a server, a client computer, a desktop computer, a laptop computer, a tablet computer, or any other machine capable of performing one or more of the functions and operations discussed herein. In some embodiments, the user systems 102, 104 communicate with the application management platform 100 via a data communication network, such as the Internet, a local area network (LAN), wide area network (WAN), and so forth. In particular implementations, the user systems 102, 104 may be accessed or operated by any type of user, such as an application developer, network administrator or end-user of an application. In other implementations, one or more functions performed by the user systems 102, 104 may be handled automatically and without user intervention.

The application management platform 100 may include a load balancer 106 and an orchestrator 108. The load balancer 106 receives requests and other information from user systems 102, 104. The load balancer 106 analyzes the received request and may route the request to one of multiple virtual machines 114 hosting an application associated with the request. If multiple virtual machines 114 are hosting a particular application, the load balancer 106 will route the received request in a manner that load-balances the application tasks across the multiple virtual machines 114. Additionally, the load balancer 106 may communicate with other modules and components in the application management platform 100 to manage, or assist with managing, the operation of the system and the applications running on the virtual machines 114.

The orchestrator 108 coordinates the operation of various tasks and operations associated with managing the applications running on the virtual machines 114. For example, the orchestrator 108 manages the provisioning of one or more virtual machines 114 on which one or more applications are hosted. The orchestrator 108 also stores information (e.g., status information) associated with the virtual machines 114 to manage the multiple applications. That information is communicated from the orchestrator 108 to the load balancer 106 such that the load balancer 106 can apply the information to load-balance application tasks and requests across the virtual machines 114.

In some embodiments, the orchestrator 108 reads and updates runtime states and configuration associated with the virtual machines 114 and the applications hosted thereon. Additionally, the orchestrator 108 may communicate directly with specific virtual machines 114, as necessary, to request application-specific information associated with an application hosted on the specific virtual machine 114.

The application management platform 100 may also include a monitoring module 110 that monitors the operation of the virtual machines 114. Information obtained by the monitoring module 110 may be provided to the orchestrator 108 and the load balancer 106 for use in load-balancing and other application management tasks. A repository 112 stores various information received by and generated by the applications, components, and modules associated with the methods and systems discussed herein. For example, the repository 112 may store application binaries, configuration information, runtime state information, and the like.

The repository 112 is accessed by multiple components and modules, such as the orchestrator 108, the monitoring module 110, and the virtual machines 114. The repository 112 may also be referred to as a "repository server." As shown in FIG. 1, the orchestrator 108 and the monitoring module 110 each communicate with the load balancer 106, the virtual machines 114, and the repository 112.

In the example of FIG. 1, the application management platform 100 includes multiple virtual machines 114. The individual virtual machines are identified as 116, 118, and 120. A particular embodiment may include any number of individual virtual machines operating at a specific time. The number of operating virtual machines typically changes over time as new virtual machines are provisioned or terminated based on the changing needs of the end-users, the systems utilizing the virtual machines, and the like.

Figure 2:
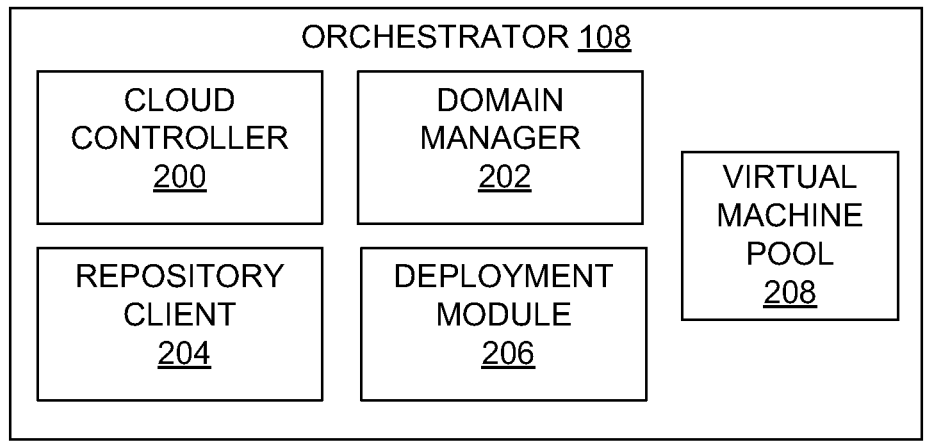
FIG. 2 is a block diagram of an example orchestrator.

FIG. 2 is a block diagram of the example orchestrator 108. The orchestrator 108 includes a cloud controller 200, a domain manager 202, a repository client 204, and a deployment module 206. The cloud controller 200 manages operation of the virtual machines 114. For example, the cloud controller 200 may determine when to transfer an unused virtual machine into a pool of available virtual machines. Thus, rather than terminating an existing virtual machine, the cloud controller 200 determines whether to make the existing virtual machine available to host other applications (or instances of applications). By keeping the existing virtual machine in a pool of available virtual machines, the application management platform 100 can deploy an application on the existing virtual machine relatively quickly as compared to provisioning a new virtual machine.

The domain manager 202 starts, pauses, and stops running applications (e.g., instances of applications running on the virtual machines 114). The domain manager 202 may also obtain status information from applications running on the virtual machines 114. The repository client 204 communicates with repository 112 to, for example, store data to repository 112 and access data from repository 112. The deployment module 206 performs various tasks associated with the deployment of applications. For example, the deployment module 206 may communicate various application binary artifacts within the application management platform 100. As discussed herein, an application component is a logical entity that has a name and abstracts various binaries associated with the component. A binary artifact is a file that is, for example, communicated by the deployment module 206 within the application management platform 100.

In some embodiments, the orchestrator 108 includes a virtual machine pool 208 that contains information regarding virtual machines that are available to run instances of applications. The virtual machine pool 208 may also contain other information associated with the virtual machines, such as virtual machine configuration data. The virtual machine pool 208 is discussed in greater detail herein.

Figure 3:
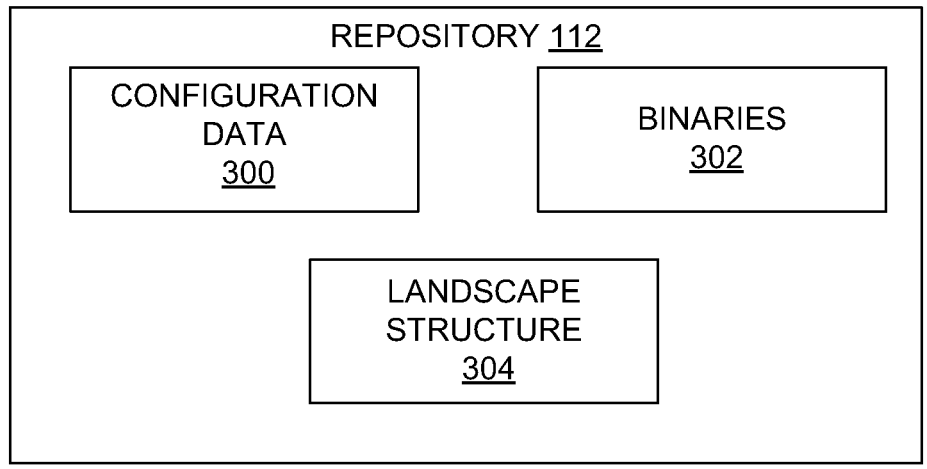
FIG. 3 is a block diagram of an example repository.

FIG. 3 is a block diagram of the example repository 112. The repository 112 includes configuration data 300, one or more binaries 302, and a landscape structure 304. The configuration data 300 includes, for example, information used by the orchestrator 108, the monitoring module 110, and other components and applications discussed herein. The binaries 302 include, for example, binary files associated with the applications deployed on the application management platform 100. The landscape structure 304 is a hierarchical model of containers for binaries and configuration data. The landscape structure 304 represents the particular landscape structure maintained in the repository 112. For example, the landscape structure may be associated with the application management platform 100. In particular implementations, multiple different landscape structures may exist, each representing an independent instance of the application management platform 100. The landscape structures 304 represent, for example, services that are provided by the application management platform 100 to the applications running on the platform. In some embodiments, the landscape structures 304 may include applications created, for example, by the entity that developed the application management platform 100 or created by a customer of that entity. In these embodiments, the landscape structures 304 include application structures for the running applications, which is useful in isolating applications from different vendors and separating individual applications provided by the same vendor.

Figure 4:
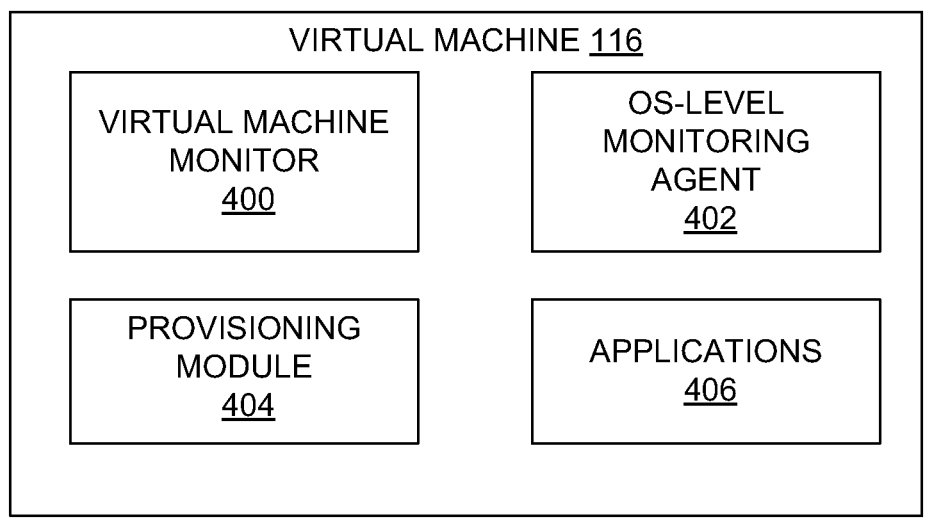
FIG. 4 is a block diagram of an example virtual machine.

FIG. 4 is a block diagram of the example virtual machine 116. The virtual machine 116 includes a virtual machine monitor 400, an operating system (OS)-level monitoring agent 402, a provisioning module 404, and one or more applications 406. The virtual machine monitor 400 monitors the status of the virtual machine 116, such as the status of each application instance running on the virtual machine 116 and the utilization of the virtual machine 116 (e.g., the amount of virtual machine resources being utilized by the currently running applications). The os-level monitoring agent 402 monitors os-level metrics associated with the virtual machine 116. These metrics include, for example, free disk storage space, processor utilization, memory utilization, and input/output data. The provisioning module 404 may assist with the provisioning of the virtual machine 116 as well as the termination of the virtual machine. The applications 406 include one or more instances of applications hosted by the virtual machine 116. These may include multiple instances of the same application or instances of different applications.

Figure 5:
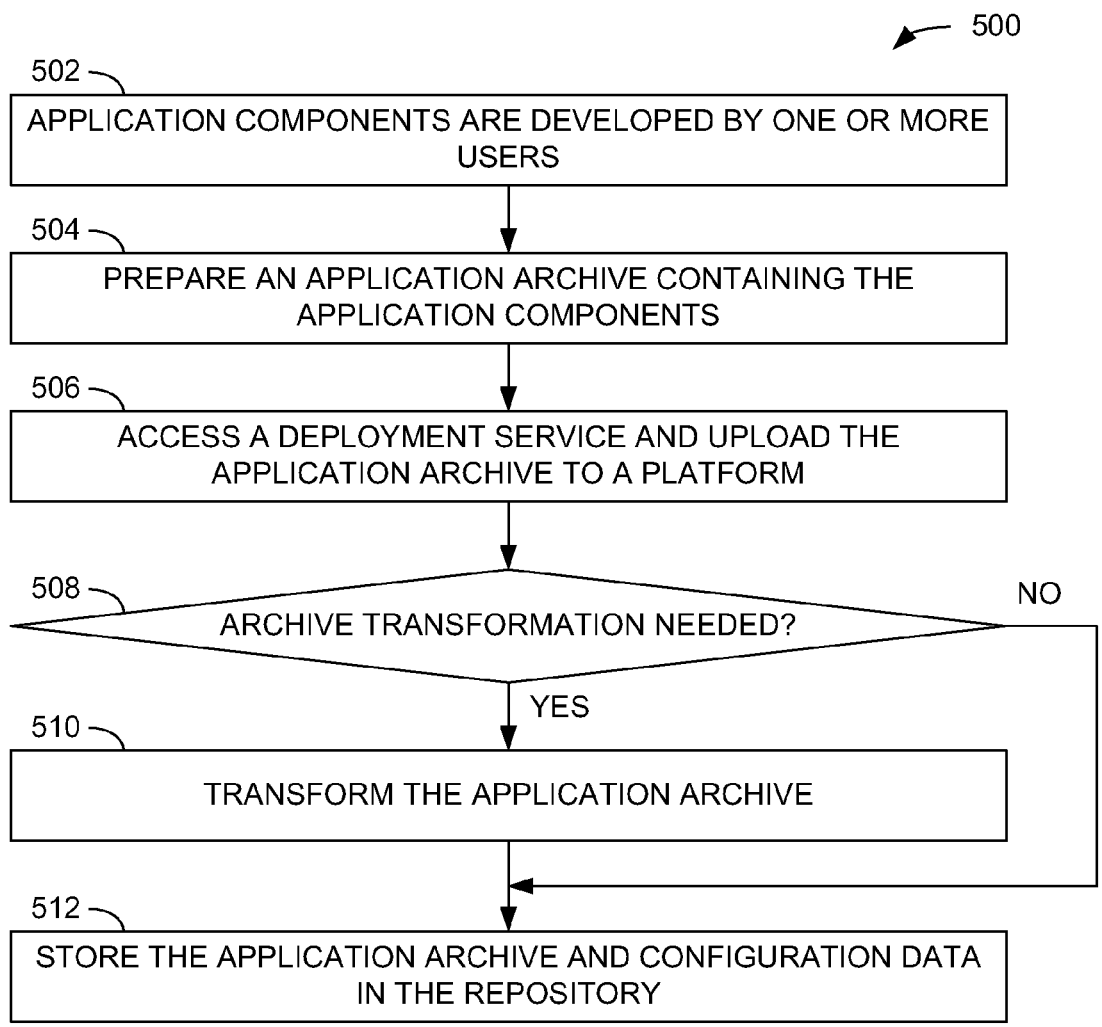
FIG. 5 is a flow diagram of an example method of deploying an application.

FIG. 5 is a flow diagram of an example method 500 of deploying an application. Before deploying an application, various application components are developed by one or more users at 502. These application components include, for example, binary files, configuration files, and other data that defines the operation of the application. The method 500 prepares an application archive containing the application components at 504. A deployment service is accessed at 506 and the application archive is uploaded to a platform (e.g., the application management platform 100) for deployment.

The method 500 continues by determining whether an archive transformation is needed at 508. In some embodiments, applications can be provisioned when they are in a particular format. The application management platform 100 supports multiple formats. Therefore, certain formats need to be transformed into the particular format for provisioning of the application. This transformation includes repackaging the applications (or application components) such that the applications can be provisioned onto a virtual machine within the application management platform 100. In some embodiments, this transformation is performed once (e.g., during application deployment) such that the single transformation can support the starting of multiple instances of the application. If the method 500 determines that an archive transformation is needed, at 510 the application archive is transformed to correspond to the characteristics of the platform. If no transformation is needed, method 500 skips operation 510 and continues to 512 to store the application archive and configuration data in the repository. Once stored in the repository, the application archive and configuration data is accessible by virtual machines 114 and other components or applications in the application management platform 100.

Figure 6:
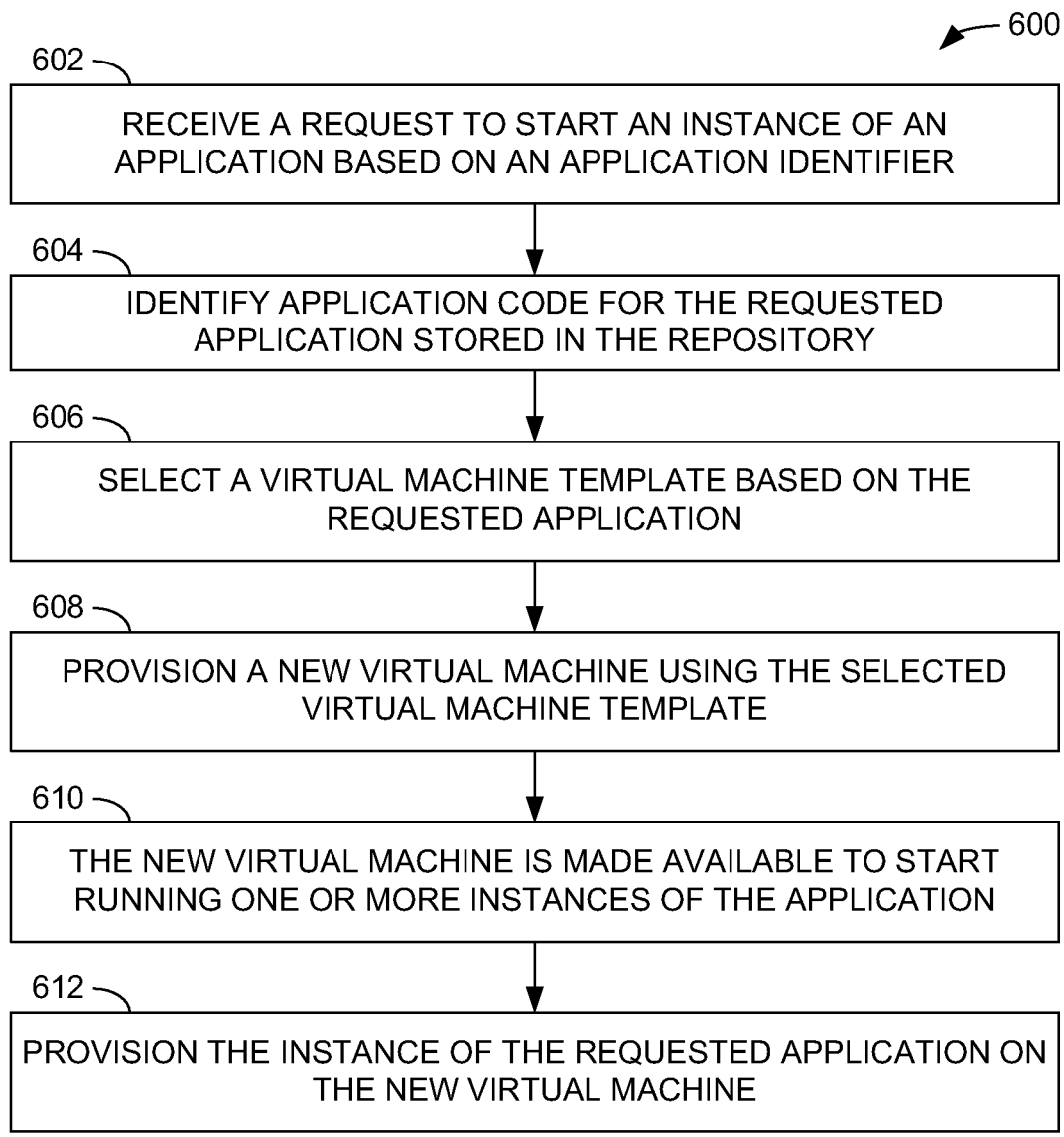
FIG. 6 is a flow diagram of an example method of provisioning a new virtual machine.

FIG. 6 is a flow diagram of an example method 600 of provisioning a new virtual machine. Initially, the method 600 receives a request to start an instance of an application based on an application identifier at 602. An instance of an application may also be referred to as an "application instance." The "application identifier" is a unique name (or other identity) associated with a particular instance of an application. For example, an application identifier may be the tuple (<account name>, <application name>), where the <account name> is a technical (and human readable) representation of a vendor organization (e.g., "Acme"), and <application name> is a technical (and human readable) name for the application (e.g., "procurement").

In a particular example, the request to start an instance of an application is received from a user or another system. In some implementations, the requested application may already be running on one or more virtual machines. However, an additional virtual machine may be necessary to adequately service an additional instance of the application. The method 600 also identifies application code for the requested application stored in the repository. This application code includes, for example, binary files that will be used by the new virtual machine to host one or more instances of the application. The request to start an instance of an application (received at 602) triggers the method 600 to identify and access the appropriate application code and other data necessary to start the instance of the application. The user or system requesting the application is not required to identify the application code or other data. Instead, the application platform management system 100 performs these functions in response to the request.

The method 600 continues by selecting a virtual machine template based on the requested application at 606. The virtual machine template provides information necessary to provision a new virtual machine and configure the new virtual machine to host the requested application. In some embodiments, the virtual machine template is a binary file that represents a virtual machine image, which may include a guest operating system and any applications used to manage the virtual machine. The binary file may also include ping infrastructure data, virtualization environment status reporting applications, log forwarding applications (for centralizing log data), and hooks that the virtualization environment can use to execute applications on the virtual machine. In some embodiments, the virtual machine template further includes information related to the configuration of the virtual machine hardware, such as a number of CPUs (central processing units), number of cores, memory size, empty disk volume size, and the like. The appropriate virtual machine template is selected at 606 based on configuration information that is stored during the deployment procedure, such as the method 500 discussed herein with respect to FIG. 5.

Using the virtual machine template and the received application code, the method 600 provisions a new virtual machine at 608 to run the requested application. After provisioning the new virtual machine, the method 600 makes the new virtual machine available to start running one or more instances of the requested application at 610. Additionally, the method 600 provisions the instance of the requested application on the new virtual machine at 612. Provisioning the instance of the requested application includes starting, stopping, and monitoring the application as well as registering the application with the load balancer.

Figure 7:
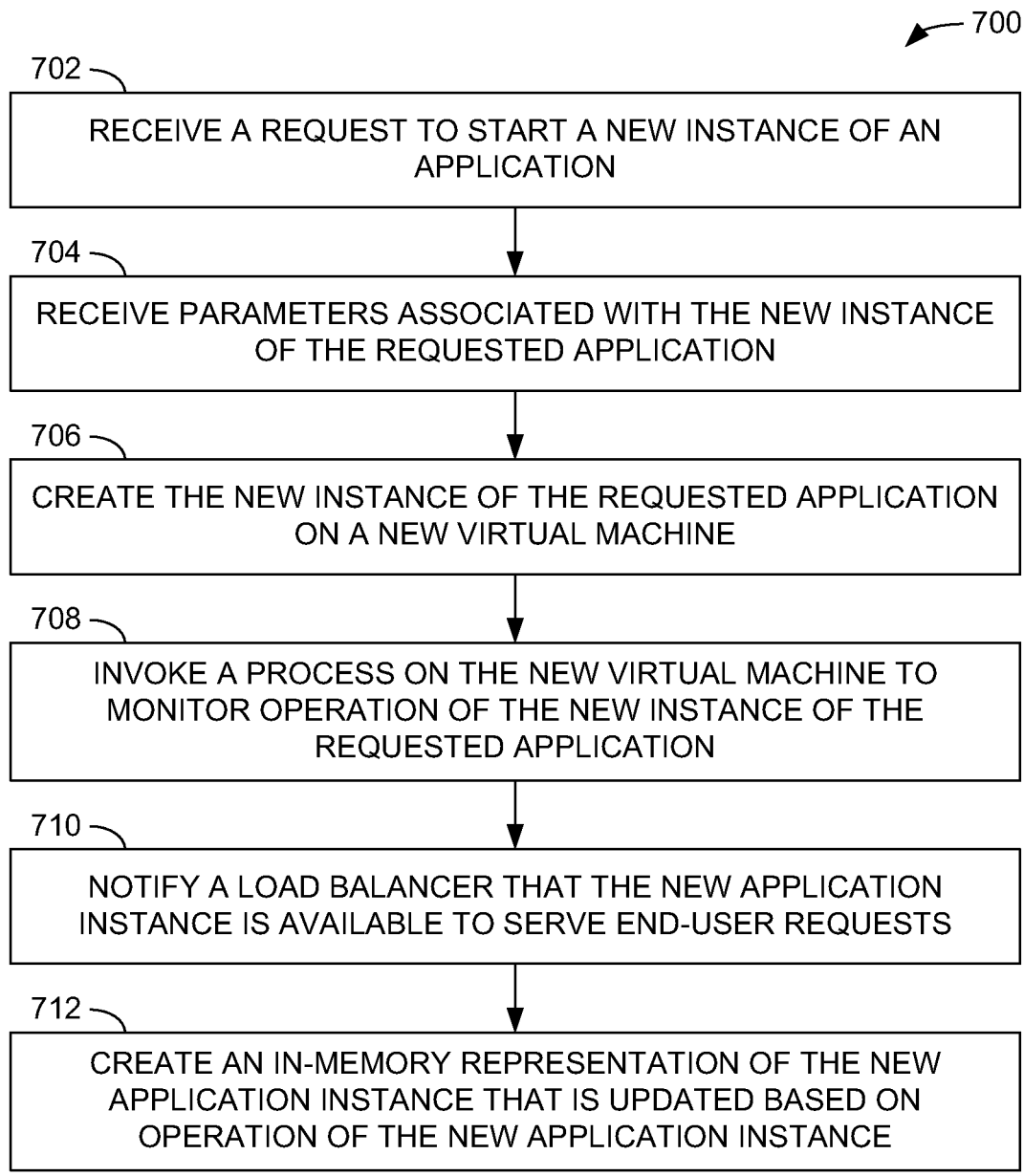
FIG. 7 is a flow diagram of an example method of starting an instance of an application.

FIG. 7 is a flow diagram of an example method 700 of starting an instance of an application. Initially, a request is received to start a new instance of an application at 702. The method 700 also receives parameters associated with the new instance of the requested application at 704. Example parameters include an application identifier and a number of new applications to be started. A new instance of the requested application is created on a new virtual machine at 706. For example, the new application instance may be hosted by the new virtual machine provisioned in FIG. 5, as discussed above.

After the new application instance is created on the new virtual machine, the method 700 invokes a process on the new virtual machine to monitor operation of the new application instance at 708. Additionally, the method 700 notifies a load balancer that the new application instance is available to serve end-user requests at 710. This allows the load balancer to distribute application processing requirements across multiple virtual machines, which includes the newly provisioned virtual machine. The method 700 then creates an in-memory representation of the new application instance at 712. In some embodiments, this in-memory representation of the new application instance is updated based on operation of the new application instance. For example, the in-memory representation may be updated on a regular basis to represent the current operating status of the new application instance. Additionally, the in-memory representation may be updated each time operation of the new application instance is paused, stopped or restarted.

Figure 8:
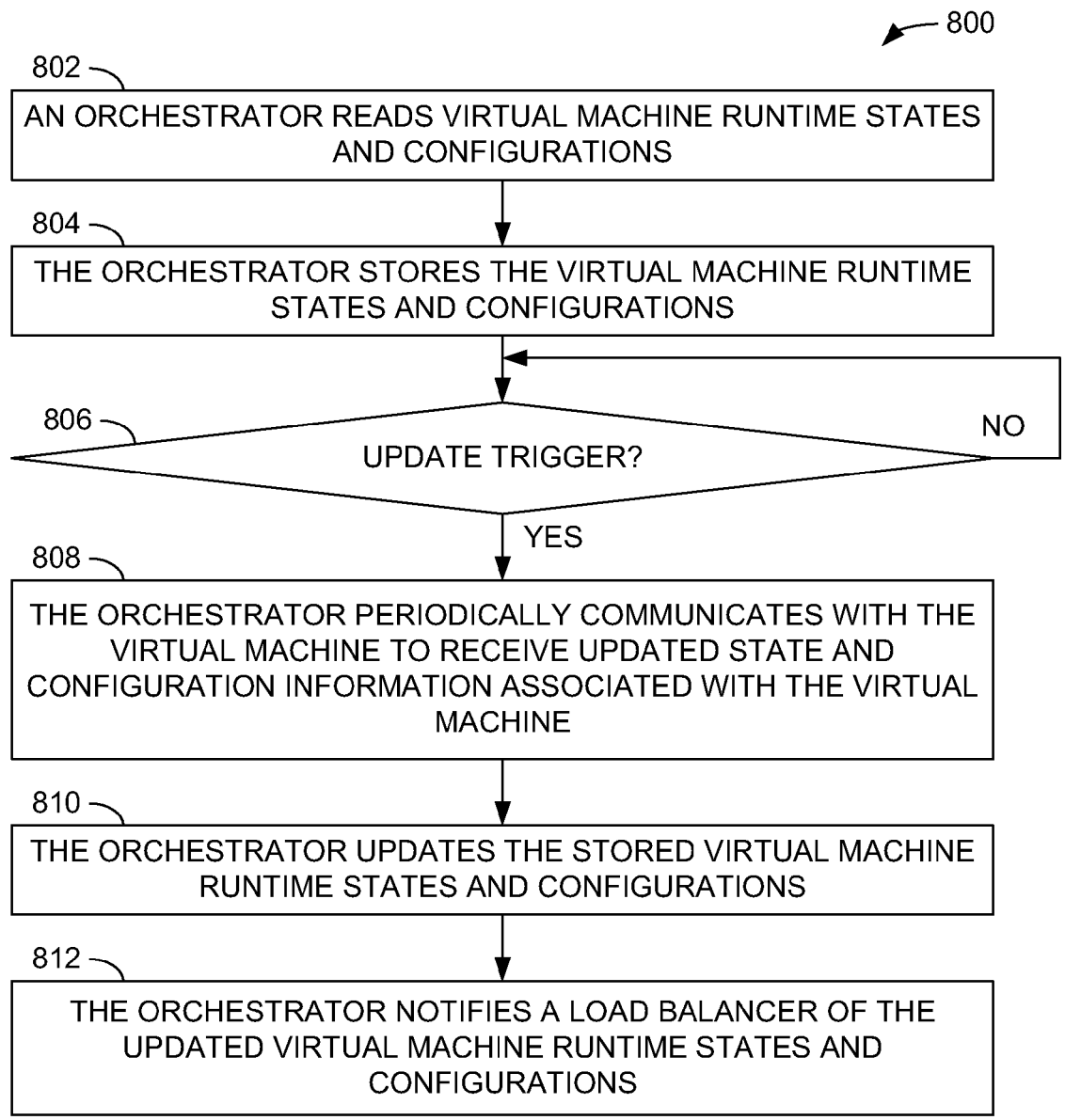
FIG. 8 is a flow diagram of an example method of updating virtual machine status and configuration information.

FIG. 8 is a flow diagram of an example method 800 of updating virtual machine status and configuration information. Initially, an orchestrator reads virtual machine runtime states and configurations at 802. For example, orchestrator 108 reads virtual machine runtime states for virtual machines 114 in FIG. 1, discussed above. The orchestrator stores the virtual machine runtime states and configurations at 804. In some embodiments, the runtime states are stored in memory. In the event of a malfunctioning orchestrator, the in-memory runtime state information can be re-created using the monitoring agents of all virtual machines running in the application management platform 100.

A time-based trigger is used to update the runtime states and configurations at periodic intervals. When an update is triggered at 806, the orchestrator communicates with the virtual machine to receive updated state and configuration information associated with the virtual machine at 808. The orchestrator then updates the stored virtual machine runtime states and configurations at 810. Additionally, the orchestrator notifies a load balancer of the updated virtual machine runtime states and configurations at 812. This updated information allows the load balancer to better allocate application requests and other resource-related tasks among the various virtual machines. For example, if a particular virtual machine has little remaining computing capacity, the load balance may shift a portion of the tasks associated with the particular virtual machine to a different virtual machine to better distribute the load across multiple virtual machines.

Figure 9:
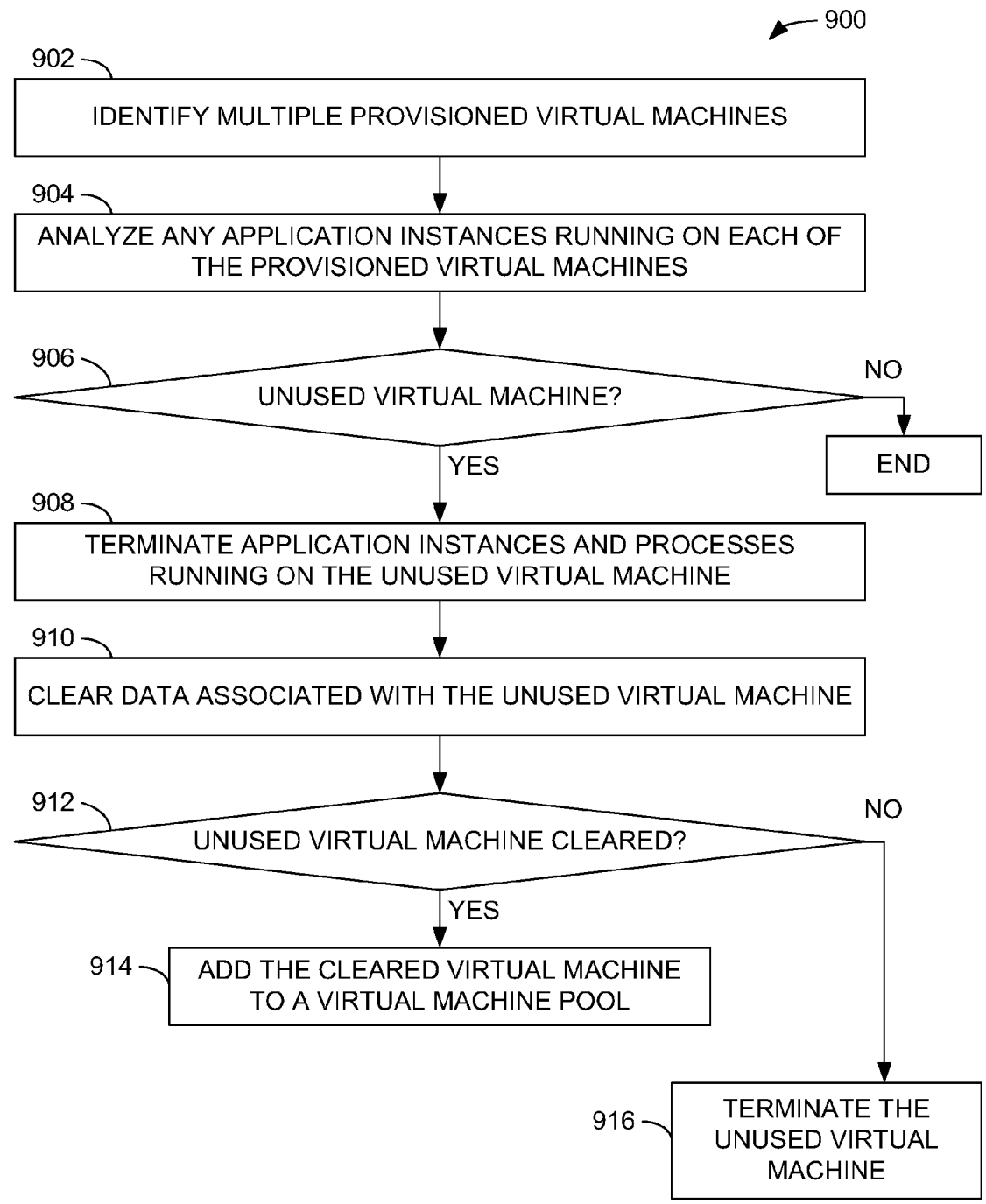
FIG. 9 is a flow diagram of an example method of managing multiple virtual machines.

FIG. 9 is a flow diagram of an example method 900 of managing multiple virtual machines. As discussed herein, operation of the application management platform 100 (FIG. 1) results in the provisioning of multiple virtual machines and the starting/stopping of application instances on those virtual machines. In some situations, a virtual machine may no longer be running an active application and, therefore, is available to run a new instance of an application. The method 900 illustrates an example process for re-using an existing virtual machine instead of terminating the existing virtual machine and provisioning a new virtual machine. In some embodiments, at least a portion of the method 900 is performed by the orchestrator 108 (FIG. 1).

Initially, the method 900 identifies multiple provisioned virtual machines 902 based on, for example, information stored in repository 112 (FIG. 1). In some embodiments, the repository 112 stores information about currently provisioned virtual machines running within application management platform 100. In other embodiments, one or more other components or systems store information regarding the currently provisioned virtual machines. The method 900 analyzes any application instances running on each of the provisioned virtual machines at 904 to determine the status (e.g., active or inactive) of the application instances. For example, the virtual machine monitor 400 (FIG. 4) regularly monitors application processes and sends that information to the orchestrator 108 (FIG. 1). The orchestrator 108 uses the information from the virtual machine monitor 400 as well as information received from the monitoring module 110 (FIG. 1) to determine the status of each application instance. In some situations, a particular virtual machine may not be running any application instances. Further, some virtual machines may include one or more instances of applications that were started on the virtual machine, but no longer active. For example, inactive application instances may include instances of applications that were deployed, but are not registered in the load balancer 106 (FIG. 1). This may occur due to an application failure, manual stoppage of the application by a user, and the like.

The method determines, at 906, whether any of the provisioned virtual machines are unused (i.e., not running any active application instances). If no unused virtual machines are identified, method 900 ends. In some embodiments, method 900 is initiated at periodic intervals to identify unused virtual machines. If one or more unused virtual machines are identified, the method 900 terminates any application instances and processes running on the unused virtual machine at 908. In some embodiments, method 900 terminates all processes that were installed during provisioning of the application instance. Additionally, data associated with the unused virtual machine is cleared at 910. The cleared data includes, for example, application settings, application data, and configuration information.

The method 900 continues by determining whether the unused virtual machine was successfully cleared of all data at 912, which includes successfully terminating all application instances and processes. If the unused virtual machine was successfully cleared, the cleared virtual machine is added to a virtual machine pool at 914. The virtual machine pool contains information relating to any number of virtual machines that are available to run instances of applications. The virtual machine pool may also contain other information associated with the virtual machines, such as virtual machine configuration data. In some embodiments, the virtual machine pool is contained within the orchestrator 108 as shown in FIG. 2 by reference indicator 208. In other embodiments, the virtual machine pool is contained in another component, module or system.

If, at 912, the unused virtual machine was not successfully cleared, the unused virtual machine is terminated at 916. For example, if any user processes remain active after the application instance is stopped, the virtual machine is terminated. These active processes may indicate a malfunctioning application, malfunctioning process or a malicious process. Rather than continuing to use the virtual machine with uncleared processes, the method 900 terminates the virtual machine to minimize the likelihood of problems with running other instances of applications.

Figure 10:
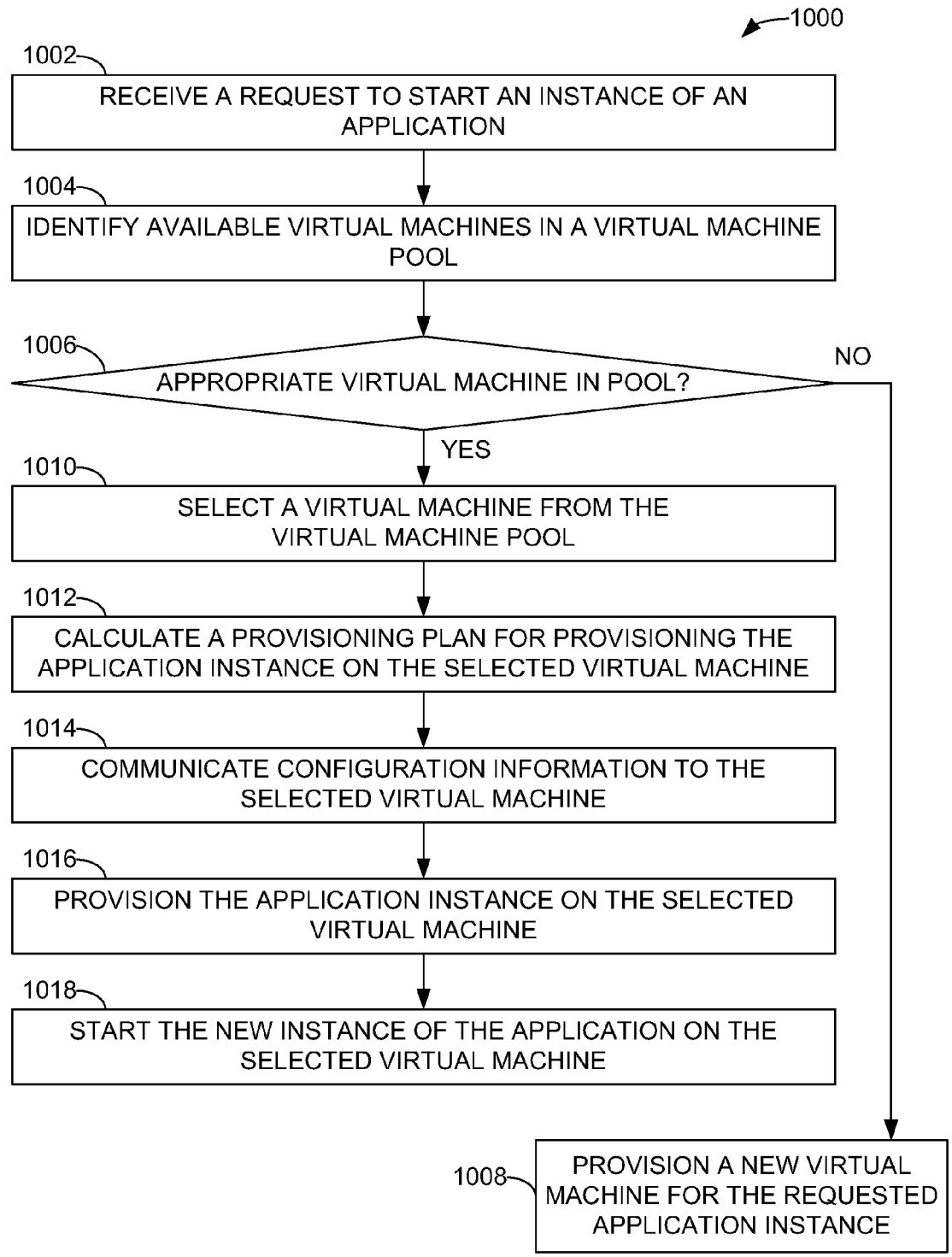
FIG. 10 is a flow diagram of an example method of selecting a virtual machine for starting a new instance of an application.

FIG. 10 is a flow diagram of an example method 1000 of selecting a virtual machine for starting a new instance of an application. In some embodiments, at least a portion of the method 1000 is performed by the orchestrator 108 (FIG. 1). Initially, method 1000 receives a request to start an instance of an application at 1002. The method 1000 identifies one or more available virtual machines in a virtual machine pool at 1004 and determines whether an appropriate virtual machine is contained in the pool at 1006. An appropriate virtual machine includes a virtual machine that is capable of running the requested application instance. For example, certain application instances may require specific virtual machine configurations, settings, and the like to operate properly. In some embodiments, an "appropriate" virtual machine has the proper visibility settings, CPU count, memory size, file storage size, and other settings necessary to run the requested application instance. In some embodiments, the request at 1002 is received by the cloud controller 200 (FIG. 2) contained in the orchestrator 108. Similarly, the cloud controller 200 identifies appropriate virtual machines in the pool at

1006. If an appropriate virtual machine is not identified in the virtual machine pool, the method 1000 continues to 1008, where a new virtual machine is provisioned for the requested application instance.

If, at 1006, an appropriate virtual machine is identified in the virtual machine pool, the method 1000 selects a particular virtual machine from the virtual machine pool at 1010. If only one virtual machine is appropriate for the requested application instance, that virtual machine is selected. If multiple virtual machines are appropriate for the requested virtual machine pool, the method 1000 selects one of the multiple virtual machines to run the requested application instance. Any selection technique may be applied to select one of the multiple virtual machines. In some embodiments, the first virtual machine on the list of multiple virtual machines is selected.

After selecting a virtual machine from the virtual machine pool, the method 1000 calculates a provisioning plan for provisioning the application instance on the selected virtual machine at 1012. The provisioning plan includes configuration information that is communicated to the selected virtual machine at 1014. The configuration information includes, for example, information for configuring the virtual machine such that the application instance is properly handled by the virtual machine. Additionally, the provisioning plan may include a sequence of scripts to be executed, locations of software packages, designations of necessary services, and the like. In some embodiments, the provisioning plan is calculated by cloud controller 200 contained in the orchestrator 108. After the virtual machine is appropriately configured, the method 1000 provisions the application instance on the selected virtual machine at 1016. The new instance of the application is then started on the selected virtual machine at 1018.

In some embodiments, the cloud controller 200 contained in the orchestrator 108 prepares the data and other information necessary for provisioning the application instance on the selected virtual machine. The cloud controller 200 also triggers starting of the application instance on the selected virtual machine through a secure connection. After starting the application instance, the cloud controller 200 awaits the results associated with the running of the application instance.

In some embodiments, orchestrator 108 (FIG. 1) communicates with the provisioning module 404 (FIG. 4) in a particular virtual machine 116. A similar module runs on each virtual machine and accepts communications from a trusted component within the orchestrator 108, such as the cloud controller 200 (FIG. 2). These communications between the orchestrator 108 and the virtual machine 116 may use an API (application programming interface) with multiple methods. The multiple methods include, for example, a method that bootstraps provisioning scripts and related information from the repository 112 to a file system associated with the virtual machine. Other methods associated with the API execute scripts on a virtual machine that return strings containing process exit code, process output, and error logs. Additional methods associated with the API transfer files to the file system of the virtual machine and get files from the file system of the virtual machine. The communications between the orchestrator 108 and the virtual machine 116 may include certificates, which are maintained in key stores, to provide secure communications.

Figure 11:
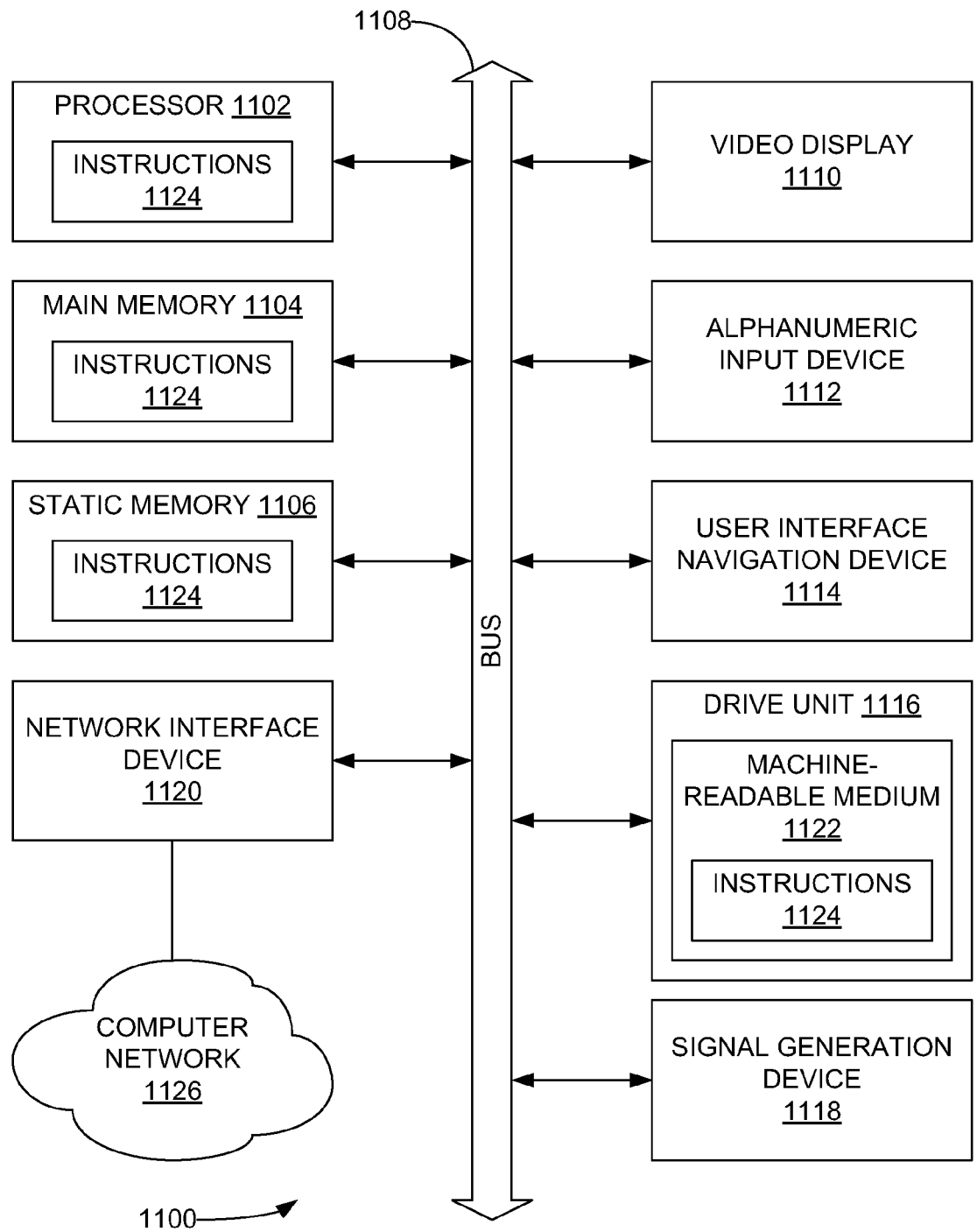
FIG. 11 depicts a block diagram of a machine in the example form of a processing system within which may be executed a set of instructions for causing the machine to perform any one or more of the methodologies discussed herein.

FIG. 11 depicts a block diagram of a machine in the example form of a processing system 1100 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1100 includes a processor 1102 (for example, a central processing unit (CPU), a graphics processing unit (GPU), or both), a main memory 1104 (for example, random access memory), and static memory 1106 (for example, static random-access memory), which communicate with each other via bus 1108. The processing system 1100 may further include video display unit 1110 (for example, a plasma display, a liquid crystal display (LCD), or a cathode ray tube (CRT)). The processing system 1100 also includes an alphanumeric input device 1112 (for example, a keyboard), a user interface (UI) navigation device 1114 (for example, a mouse), a disk drive unit 1116, a signal generation device 1118 (for example, a speaker), and a network interface device 1120.

The disk drive unit 1116 (a type of non-volatile memory storage) includes a machine-readable medium 1122 on which is stored one or more sets of data structures and instructions 1124 (for example, software) embodying or utilized by any one or more of the methodologies or functions described herein. The data structures and instructions 1124 may also reside, completely or at least partially, within the main memory 1104, the static memory 1106, and/or within the processor 1102 during execution thereof by processing system 1100, with the main memory 1104 and processor 1102 also constituting machine-readable, tangible media.

The data structures and instructions 1124 may further be transmitted or received over a computer network 1126 via network interface device 1120 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 1100) or one or more hardware modules of a computer system (for example, a processor 1102 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 1102 that is configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1102 that are temporarily configured (for example, by software) or permanently configured to perform the relevant operations. Whether temporarily or permanently configured, such processors 1102 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine but deployed across a number of machines. In some example embodiments, the processors 1102 may be located in a single location (for example, within a home environment, within an office environment, or as a server farm), while in other embodiments, the processors 1102 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A system comprising:
a repository configured to store data associated with a plurality of application instances; and
an orchestrator, including one or more processors, coupled to the repository, the orchestrator configured to:
analyze application instances running on a plurality of provisioned virtual machines;
determine a status of each of the applications instances based on information received from a process running on each of the plurality of provisioned virtual machines;
identify an unused virtual machine in the plurality of provisioned virtual machines based on the status of application instances on the unused virtual machine being inactive;
terminate the inactive application instances on the unused virtual machine;
clear data associated with the unused virtual machine;
based on the unused virtual machine being successfully cleared, add the cleared virtual machine to a virtual machine pool, the cleared virtual machine available for use by a different application instance; and
based on the unused virtual machine being unsuccessfully cleared, terminate the unused virtual machine, the unused virtual machine being unsuccessfully cleared based on at least one user process remaining active on the unused virtual machine.

2. The system of claim 1, the orchestrator further configured to notify a load balancer that the unused virtual machine is available to start a new application instance.

3. The system of claim 1, the orchestrator including a deployment module configured to communicate a plurality of application components within the system.

4. The system of claim 1, the orchestrator including a domain manager configured to access status information associated with the plurality of application instances.

5. The system of claim 1, the orchestrator including a domain manager configured to start and stop the plurality of application instances.

6. The system of claim 1, the orchestrator further configured to start a particular application on the cleared virtual machine.

7. A non-transitory computer-readable storage medium including instructions that, when executed by at least one processor of a machine, cause the machine to perform operations comprising:
    analyzing a plurality of application instances running on a plurality of provisioned virtual machines;
    determining a status of each of the application instances based on information received from a process running on each of the plurality of provisioned virtual machines;
    identifying an unused virtual machine among the plurality of provisioned virtual machines based on the status of application instances on the unused virtual machine being inactive;
    terminating the inactive application instances on the unused virtual machine;
    clearing data associated with the unused virtual machine;
    based on the unused virtual machine being successfully cleared, adding the cleared virtual machine to a virtual machine pool, the cleared virtual machine available for use by one of the plurality of application instances; and
    based on the unused virtual machine being unsuccessfully cleared, terminating the unused virtual machine, the unused virtual machine being unsuccessfully cleared based on at least one user process remaining active on the unused virtual machine.

8. The non-transitory computer-readable storage medium of claim 7, wherein the operations further comprise calculating a provisioning plan for provisioning a particular application instance on the cleared virtual machine.

9. The non-transitory computer-readable storage medium of claim 7, wherein the operations further comprise notifying a load balancer that the unused virtual machine is available to start a new application instance.

10. The non-transitory computer-readable storage medium of claim 7, wherein the operations further comprise accessing status information associated with the plurality of application instances.

11. The non-transitory computer-readable storage medium of claim 7, wherein the operations further comprise selecting the cleared virtual machine from the virtual pool responsive to receiving a request to start an instance of a particular application.

12. A method comprising:
    analyzing a plurality of application instances running on a plurality of provisioned virtual machines;
    determining a status of each of the application instances based on information received from a process running on each of the plurality of provisioned virtual machines;
        identifying an unused virtual machine among the plurality of provisioned virtual machines based on the status of application instances on the unused virtual machine being inactive;
    terminate the inactive application instances on the unused virtual machine;
    clearing data associated with the unused virtual machine;
    based on the unused virtual machine being successfully cleared, adding the cleared virtual machine to a virtual machine pool, the cleared virtual machine available for use by one of the plurality of application instances; and
    based on the unused virtual machine being unsuccessfully cleared, terminating the unused virtual machine, the unused virtual machine being unsuccessfully cleared based on at least one user process remaining active on the unused virtual machine.

13. The method of claim 12, further comprising notifying a load balancer that the unused virtual machine is available to start a new application instance.

14. The method of claim 12, further comprising calculating a provisioning plan for provisioning a particular application instance on the cleared virtual machine.

15. The method of claim 12, the analyzing of the plurality of application instances includes accessing status information associated with the plurality of application instances.

16. The method of claim 12, further comprising selecting the cleared virtual machine from the virtual pool responsive to receiving a request to start an instance of a particular application.

17. The method of claim 16, further comprising starting the requested instance of the particular application on the cleared virtual machine.

* * * * *